United States Patent [19]

Kurakake et al.

[11] Patent Number: 4,611,159
[45] Date of Patent: Sep. 9, 1986

[54] AC MOTOR CONTROL SYSTEM

[75] Inventors: Mitsuo Kurakake, Hino; Keiji Sakamoto, Hachioji, both of Japan

[73] Assignee: Fanuc Ltd., Minamitsuru, Japan

[21] Appl. No.: 637,219

[22] PCT Filed: Nov. 25, 1983

[86] PCT No.: PCT/JP83/00421
§ 371 Date: Jul. 23, 1984
§ 102(e) Date: Jul. 23, 1984

[87] PCT Pub. No.: WO84/02235
PCT Pub. Date: Jun. 7, 1984

[30] Foreign Application Priority Data

Nov. 25, 1982 [JP] Japan ............................... 57-206424

[51] Int. Cl.⁴ ............................................... H02P 5/40
[52] U.S. Cl. ..................................... 318/803; 318/811
[58] Field of Search ................. 318/811, 803, 807–810

[56] References Cited

U.S. PATENT DOCUMENTS 4,458,192 7/1984 Sakamoto et al. .................. 318/811
4,477,762 10/1984 Karakake et al. .................. 318/811
4,575,667 3/1986 Kurakake ............................ 318/811

OTHER PUBLICATIONS

Le-Huy et al., "Microprocessor Control of a Current-Fed Synchronous Motor Drive", Conference: Industry Applications Society IEEE-IAS Meeting, Cleveland, OH, U.S.A. (Sep. 30–Oct. 4, 1979).

Primary Examiner—David Smith, Jr.
Attorney, Agent, or Firm—Staas & Halsey

[57] ABSTRACT

There are provided a sensor (113) for sensing the velocity of an AC motor (101), a sensor (112) for sensing an actual current flowing into the AC motor (101), a power drive circuit for driving the AC motor (101), and a control unit (108) for performing a velocity loop computation to obtain a current command from an offset velocity between a velocity command for the AC motor (101) and the sensed actual velocity, and for performing a current loop computation to obtain an offset current between the current command and the sensed actual current. In the current loop computation performed by the control unit (108), there is obtained a velocity compensation signal by amplifying the sensed actual velocity by a predetermined magnification, the command for the power drive circuit is compensated by the velocity compensation signal, the current loop computation is executed at a sampling period shorter than that at which the velocity loop computation is executed, and, at the time of the velocity loop computation, the actual current at the relevant sampling instant is estimated from the current command value of the previous sampling, and a current command is computed from the estimated actual current and the offset current.

3 Claims, 9 Drawing Figures

4,611,159

AC MOTOR CONTROL SYSTEM

DESCRIPTION

Background of the Invention

This invention relates to an AC control system in which a velocity loop computation and a current loop computation for an AC motor are performed by a microprocessor to control the AC motor. More particularly, the invention relates to an AC motor control system capable of enhancing the response characteristics of the velocity and current loops.

An arithmetic circuit such as a microprocessor has recently come to be employed for servo-controlling an AC motor. It is required that the microprocessor execute at least a velocity loop computation, in which a current command is computed from an offset velocity between a commanded velocity and the actual velocity of the AC motor, and a current loop computation, in which a command for application to the current drive circuit of a servomotor is computed based on a difference between a current command and the armature current of the servomotor.

In order to obtain a desirable servomotor operating characteristic, it is required that the response characteristic of the current loop be quicker than that of the velocity loop. Since there is interference between current and velocity ascribable to a back electromotive force in a servomotor, the velocity loop and current loop computations cannot be rendered independent of each other and both computations must be executed at a predetermined sampling period. The result is a burden upon the microprocessor in terms of processing time.

Moreover, even if the velocity computation is executed at a period which is longer than that at which the current loop computation is executed, the computation for obtaining the effective current requires a long period of time when performed at the time of the velocity loop computation. A problem that results is a deterioration in the response of the velocity loop.

Summary of the Invention

An object of the present invention is to provide an AC motor control system capable of enhancing the response characteristic of a current loop and, moreover, of a velocity loop.

An AC motor is controlled by providing a sensor for sensing the velocity of the AC motor, a sensor for sensing an actual current flowing into the AC motor, a power drive circuit for the AC motor, and a control unit for performing a velocity loop computation to derive a current command from an offset velocity between a velocity command for the AC motor and the sensed actual velocity, and for performing a current loop computation to obtain an offset current between the current command and the sensed actual current, the offset current obtained by the control unit being applied to the power drive circuit to control the AC motor. In the current loop computation, a velocity compensation signal is obtained by amplifying the sensed actual velocity by a predetermined magnification, the command for the power drive circuit is compensated by the velocity compensation signal, and the current loop computation is executed at a sampling period shorter than that at which the velocity loop computation is executed. At the time of a velocity loop computation, the actual current at the relevant sampling instant is estimated from the current command value of the previous sampling, and a current command is computed from the estimated actual current and the offset current.

DESCRIPTION OF THE PREFERRED EMBODIMENT

Figure 1:
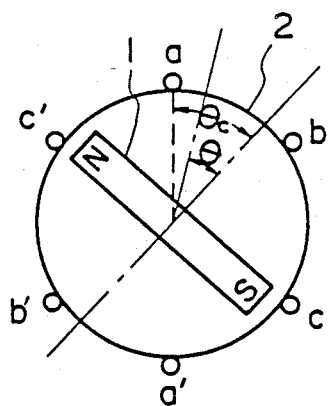
FIG. 1 is a view showing the construction of a synchronous motor.

The present invention will now be described in detail in accordance with the drawings.

A synchronous motor may serve as a servomotor which requires a current loop having a quick response characteristic.

In a synchronous motor of this kind, it is necessary that torque be controlled so as to be constant. To this end, there has been developed a technique in which control is exercised in such a manner that a current of the same phase as an electromotive force induced by the rotor is caused to flow into the windings of the armature, which serves as the stator. This technique will now be described using the drawing of FIG. 1, which shows the construction of a synchronous motor. The magnetic flux density B at a position displaced by $\theta$ degrees from the q axis of the magnetic field generated by a rotor 1, namely a permanent magnet, is given by the following:

$$B = B_m \sin \theta \tag{1}$$

The magnetic flux $\phi$ interlinked with the a winding of a stator 2 shown in FIG. 1 is expressed as follows:

$$\phi = -\phi_m \cos \theta_c \tag{2}$$

where $\phi_m$ represents the magnetic flux on the q axis of the rotor 1.

Accordingly, the electromotive force $e_1$ induced in the a winding is expressed as follows:

$$\begin{aligned} e_1 &= -d\phi/dt \\ &= -\phi_m \cdot p \cdot \omega_m \cdot \sin\theta \end{aligned} \tag{3}$$

(where $\theta = P\theta m = P \cdot \omega_m \cdot t$).

Likewise, the electromotive forces $e_2$, $e_3$ induced in the b and c windings of the stator 2, which are disposed at angles of $\frac{2}{3}\pi$ and $\frac{4}{3}\pi$ relative to the a winding, respectively, are expressed by the following:

$$e_2 = -\phi_m \cdot P \cdot \omega_m \sin(\theta - \tfrac{2}{3}\pi) \tag{4}$$

$$e_3 = -\phi_m \cdot P \cdot \omega_m \sin(\theta - 4/3\pi) \tag{5}$$

If we let the currents flowing in the armature windings a, b, c be $i_1, i_2, i_3$, respectively, then the output torque T of such a three-phase synchronous motor will be expressed by the following:

$$T = \tfrac{1}{2}(e_1 \cdot i_1 + e_2 \cdot i_2 + e_3 \cdot i_3) \tag{6}$$

Therefore, substituting Eqs. (3), (4) and (5) into Eq. (6), we have:

$$T = -\tfrac{1}{2}\phi_m \cdot P \cdot \omega_m \{i_1 \cdot \sin\theta + i_2 \cdot \sin(\theta - \tfrac{2}{3}\pi) + i_3 \cdot \sin(\theta - 4/3\pi)\} \tag{7}$$

To render the torque T constant, it should be so arranged that T is independent of the angle $\theta$. Therefore, if the following relations hold, namely:

$$\begin{aligned} i_1 &= I\sin\theta \\ i_2 &= I\sin\left(\theta - \tfrac{2}{3}\pi\right) \\ i_3 &= I\sin\left(\theta - \tfrac{4}{3}\pi\right) \end{aligned} \tag{8}$$

where I is the current amplitude, then the torque T of Eq. (7) may be written as follows:

$$T = \tfrac{1}{2}K\left\{I\sin^2\theta + I\sin^2\left(\theta - \tfrac{2}{3}\pi\right) + I\sin^2\left(\theta - \tfrac{4}{3}\pi\right)\right\} \tag{9}$$

$$= \tfrac{3}{2}KI$$

Thus, the torque T is constant, being independent of the rotational orientation of the rotor 1.

To carry out such control, it is necessary to detect the rotor angle of the synchronous motor and regulate each of the armature current values in accordance therewith.

However, if the current flowing through each armature winding is delayed by $\phi_o$ from the ideal value, then the currents $i_1, i_2, i_3$ of the respective armature windings will take on the form:

$$i_1 = I\sin(\theta - \phi_o)$$

$$i_2 = I\sin(\theta - \tfrac{2}{3}\pi - \phi_o)$$

$$i_3 = I\sin(\theta - 4/3\pi - \phi_o)$$

In consequence, the output torque T will take on the form:

$$T = 3/2 KI \sin(\pi/2 + \phi_o) \tag{10}$$

Thus, the torque will decrease in value.

Figure 2:
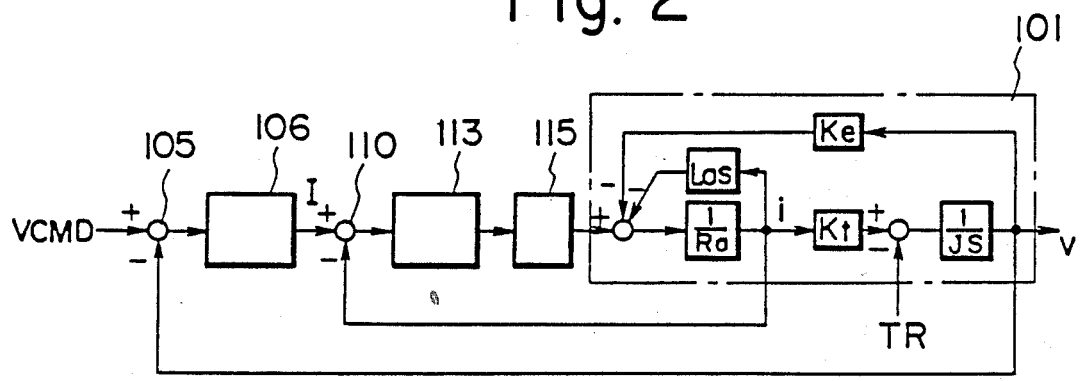
FIG. 2 is a block diagram of conventional servo control.

Thus, in order to effect control to render the torque of a synchronous motor constant, it is necessary to improve the actual current response with respect to the current command. Specifically, as shown in the block diagram of FIG. 2 illustrating a conventional control circuit for a synchronous motor, the actual rotational velocity v of a synchronous motor 101 is detected, the difference between v and a commanded velocity VCMD is found by an arithmetic unit 105, the velocity difference obtained is converted into a current command I by a velocity loop computing circuit 106, thereafter the difference between the current command I and the actual current i flowing into the synchronous motor 1 is computed by an arithmetic unit 110, the current difference is operated upon by a current loop computing circuit 113, and the output of the computing circuit 113 is power amplified by a pulse width modulator/inverter circuit 115, the output of the circuit 115 being applied to the synchronous motor 101.

To execute the foregoing by a microprocessor, the operation performed by the circuitry from the arithmetic unit 105 to the current loop arithmetic unit 113 should be executed by computer processing. The processing is required to be carried out at a sampling period dependent upon the response characteristic of the current loop. However, since there is interference between current and velocity ascribable to a reverse electromotive force in the servomotor, the velocity loop and current loop computations cannot be rendered independent of each other and both computations must be executed at a predetermined sampling period. The result is a burden upon the microprocessor in terms of processing time.

Therefore, according to the present invention, it is arranged so that the current loop can be operated independently of the velocity loop, and so that the period of the current loop computation is made shorter than that of the velocity loop computation. Stated in reverse, the period of the velocity loop computation is lenthened, the microprocessor load is lightened, and the period of the current loop computation is shortened.

Further, according to the present invention, in order to enhance the response of the velocity loop computation the period thereof if lengthened, an armature current component is fed back to the velocity loop. Moreover, this armature current component is predicted from the current command of the previous sampling to prevent an increase in the processing time of the microprocessor.

Figure 4:
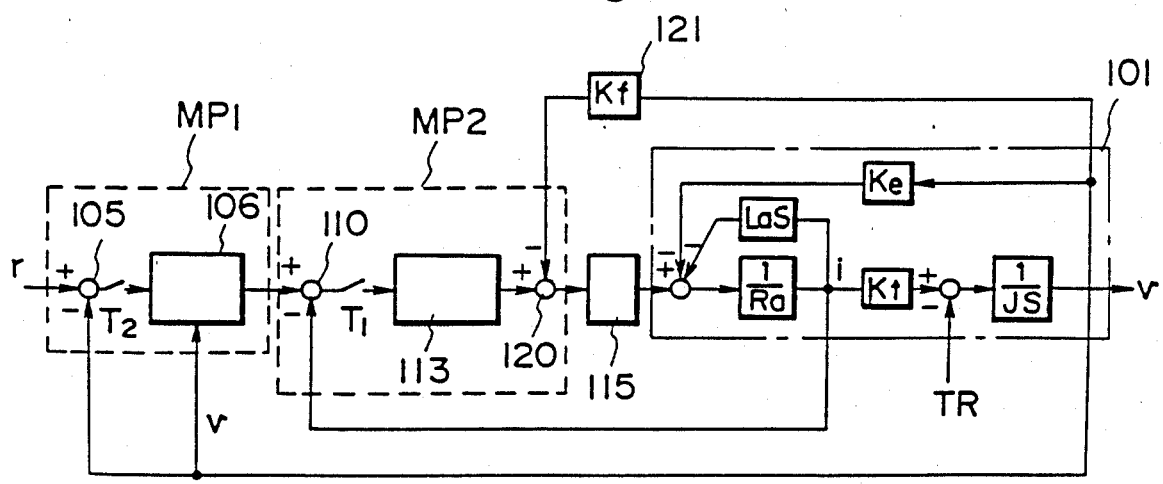
FIG. 4 is a block diagram of servo control according to the present invention.

FIG. 4 is a block diagram illustrating an embodiment of the present invention. Portions similar to those shown in FIG. 2 are designated by like reference characters. Numeral 120 denotes an adder, and 121 a multiplier, these elements constituting velocity feedback. MP1 denotes a first microprocessor for performing the operations of the arithmetic circuit 105 and velocity loop arithmetic unit 106 by computer processing at a period $T_2$. MP2 denotes a second microprocessor for performing the operations of the arithmetic circuit 110 and current loop arithmetic unit 113 by computer processing at a period $T_1$. The periods $T_1$, $T_2$ of the microprocessors MP1, MP2 are related as follows:

$$T_2 = nT_1 \tag{11}$$

where n is an integer of two or more.

The first microprocessor MP1 also performs IP control by executing the velocity loop computation, and the output u(k) of the microprocessor MP1 is given by the following equation:

$$u(k) = -k_1 \sum_{i=0}^{k}[v(i) - r(i)] - k_2 \cdot v(k) - k_3 \cdot i(k) \tag{12}$$

where v(i) represents the actual rotational velocity, r(i) the commanded velocity, and i(k) the effective armature current.

The effective armature current i(k) is expressed by the following equation using the actual phase currents $i_{av}, i_{aw}, i_{au}$ of the synchronous motor 101:

$$i(k) = \left(\frac{i_{au}}{\sqrt{2}}\right)^2 + \left(\frac{i_{av}}{\sqrt{2}}\right)^2 + \left(\frac{i_{aw}}{\sqrt{2}}\right)^2 \tag{13}$$

$$i(k) = \frac{1}{2}(I_{au}^2 + I_{av}^2 + I_{aw}^2)$$

However, since execution time for a multiplication instruction is longer than that required for other instructions as far as a microprocessor is concerned, sensing the phase currents and performing this computation increases the load on the microprocessor MP1. Therefore, the output $u(k-1)$ at the time of the previous sampling is assumed to be the effective armature current at time k:

$$i(k) = u(k-1) \tag{14}$$

That is, when the output $u(k-1)$ from the microprocessor MP1 is delivered at time $(k-1)$ to the current loop (microprocessor MP2), the current loop exercises control at the period $T_1$ in such a manner that the effective current attains the value $u(k-1)$ by the next sampling instant (k) of the velocity loop. In other words, the current loop is designed with a set proportional integration coefficient, described below, in such a manner that the actual phase current is set to the compound output u of the velocity loop during the sampling period $T_2$. With such an arrangement, the effective current at the sampling instant k can be assumed to be $u(k-1)$. Accordingly, substituted Eq. (14) into Eq. (12) gives us:

$$u(k) = -k_1 \sum_{i=0}^{k}[v(i) - r(i)] - k_2 \cdot v(k) - k_3 \cdot u(k-1) \tag{15}$$

As a result of the microprocessor MP1 performing the operation of Eq. (15) every point $T_2$, it becomes possible to carry out IP control by complete feedback control of the object controlled, thereby stabilizing the system and introducing an integration characteristic with respect to the error between a command and a controlled quantity to further improve the response characteristic.

Further, in FIG. 4, the microprocessor MP2, which includes the current loop arithmetic unit, is provided with velocity feedback (the multiplier 121 and adder 120) to cancel the actual velocity dependence of the current loop and to render the operation of the current loop independent of the operation of the velocity loop.

Specifically, if the synchronous motor 101 is expressed in terms of a transfer function, as shown in FIG. 2, the current loop includes feedback from the velocity v, which is attributed to the back electromotive force constant Ke of the motor. TR represents load torque, and La, Ra, Kt, J denote transfer constants. This velocity feedback has an effect upon the actual current. At high velocity, the current loop is influenced by the velocity v, resulting in diminished actual current response.

Figure 3:
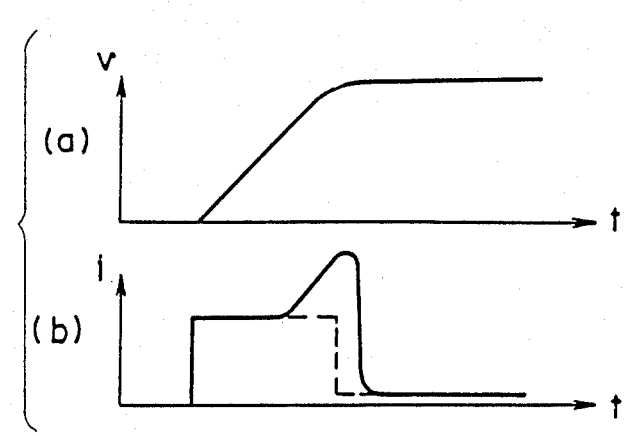
FIG. 3 is a view for describing velocity and current on the basis of the conventional control system.

More specifically, let us consider acceleration. As shown in FIG. 3, in a situation where velocity feedback is negligible, velocity v and actual current i make ideal transitions with respect to time t, as shown by the dashed lines. Due to velocity feedback, however, the actual current i is influenced by the velocity v, as shown by the solid line. The result is a greater current value and prolonged acceleration time.

In FIG. 2, a differential equation involving actual velocity v and actual current i, in which load torque is negligible, may be written as follows:

$$\frac{d}{dt}\begin{pmatrix}v\\i\end{pmatrix} = \begin{pmatrix}0 & \frac{Kt}{J}\\-\frac{Ke}{La} & -\frac{Ra}{La}\end{pmatrix}\times\begin{pmatrix}v\\i\end{pmatrix}+\begin{pmatrix}0\\\frac{1}{La}\end{pmatrix}e \tag{16}$$

The foregoing will be explained below in terms of a discrete value system considering implementation by a microprocessor.

Rewriting Eq. (10) in a discrete value system at a sampling period T will give us the following:

$$v(k+1) = \phi_{11}\cdot v(k) + \phi_{12}\cdot i(k) + h_1\cdot u(k) \tag{17}$$

$$i(k+1) = \phi_{21}\cdot v(k) + \phi_{22}\cdot i(k) + h_2\cdot u(k) \tag{18}$$

where u(k) represents the output of the current loop computing circuit 113.

It will be appreciated from Eq. (18) that eliminating the velocity term v(k) will render the current $i(k+1)$ independent of velocity.

Therefore, the arrangement is such that velocity feedback is applied to the current loop, and the inherent velocity feedback of the synchronous motor is cancelled. If we assume that the multiplier 121 has a transfer constant kf and that this velocity feedback is applied to Eq. (12), then Eq. (18) may be written:

$$i(k+1) = (\phi_{21} - kf\cdot h_2)v(k) + \phi_{22}\cdot i(k) + h_2\cdot u(k) \tag{19}$$

Therefore, if a selection is made such that:

$$\phi_{21} - kf\cdot h_2 = 0$$

$$\therefore kf = \phi_{21}/h_2 \tag{20}$$

then Eq. (19) will reduce to:

$$i(k+1) = \phi_{22}i(k) + h_2 u(k) \tag{21}$$

so that the actual current $i(k+1)$ will be independent of the velocity v.

Accordingly, the characteristic of the current loop can be controlled independently of the velocity of the synchronous motor and, hence, there will be no deterioration in the response of the current loop even at high speeds.

Figure 5:
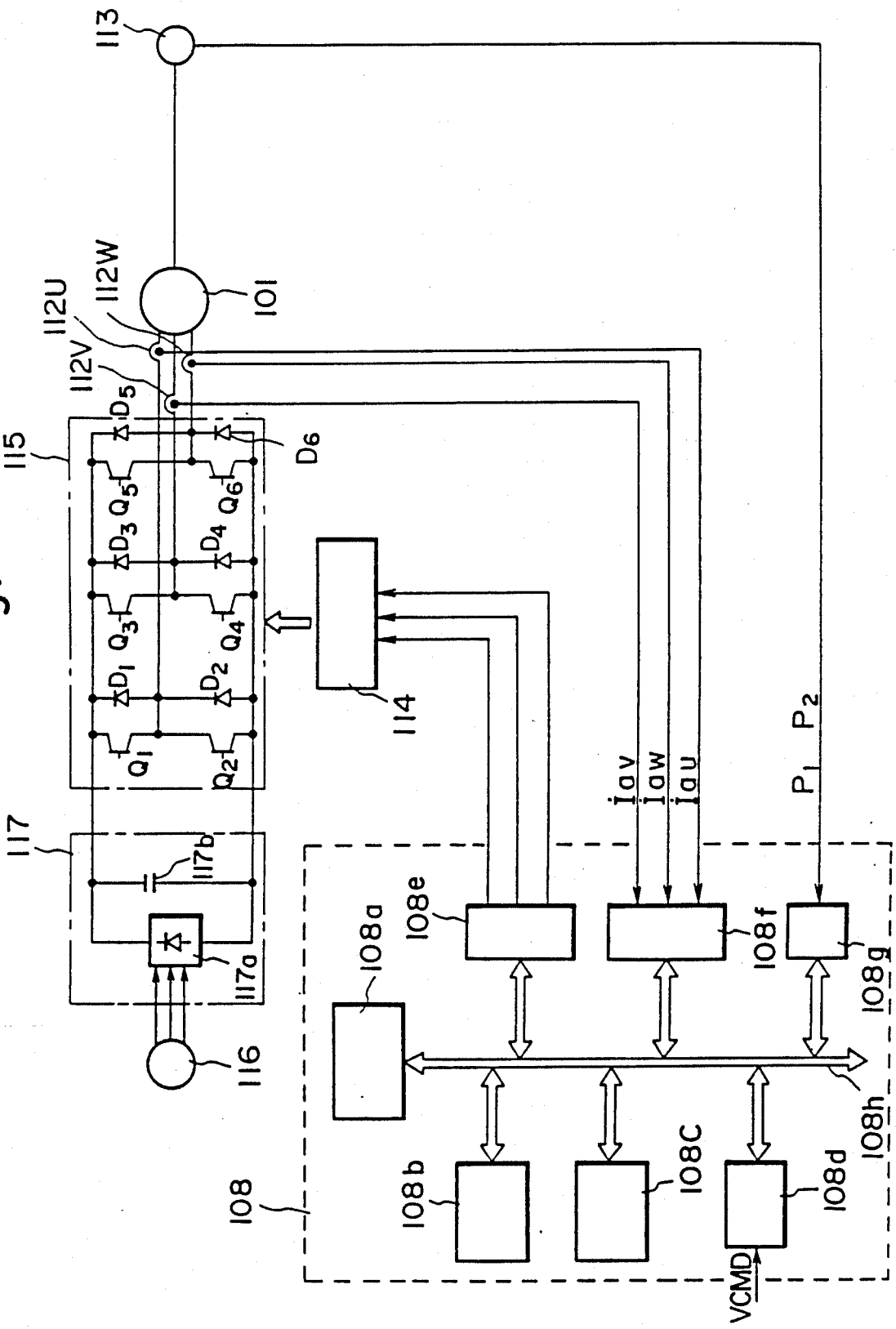
FIG. 5 is a circuit diagram of an embodiment of the present invention.

FIG. 5 is a circuit diagram of an embodiment of the present invention, in which the velocity loop and current loop computations are executed by a single microcomputer.

Figure 6:
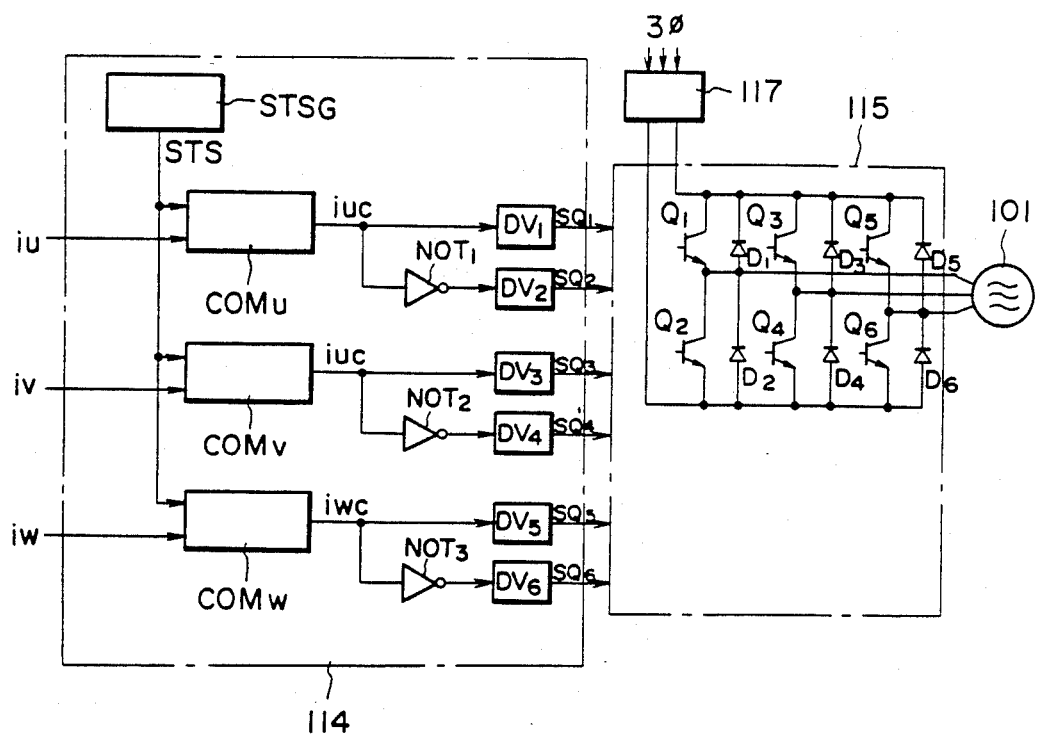
FIG. 6 is a view showing the construction of a principal portion of FIG. 5.
Figure 7:
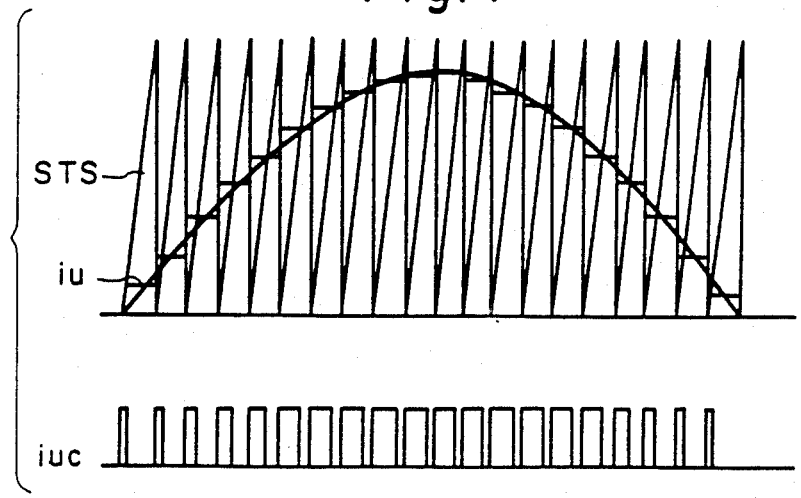
FIG. 7 is a view for describing the operation of the arrangement shown in FIG. 6.

In the Figure, numeral 101 denotes a synchronous motor of revolving field type. Numeral 108 denotes a computation control unit which, by a computing operation based on a control program, performs the operations of the arithmetic circuit 105, velocity loop computing circuit 106, arithmetic circuit 110, current loop computing circuit 113 and adder 120 of FIG. 4. The computation control unit 108 comprises a processor 108a for performing arithmetic operations in accordance with a motor control program, a program memory 108b storing the motor control program, a data memory 108c for storing data, an input/output port 108d for receiving commands from an external unit such as an NC unit, a digital-to-analog (DA) converter 108e for applying an analog current command to a pulse-width modulation circuit 114, an analog-to-digital (AD) converter 108f which receive phase currents $I_{au}$, $I_{av}$, $I_{aw}$ from current transformers 112U, 112V, 112W for converting these into digital values, a counter 108g in which a position code indicating the rotational position α of the field pole of the synchronous motor 101 is initially loaded from a pulse coder 112, the counter thereafter counting rotation pulses P1, P2 generated by the pulse coder 112 whenever the synchronous motor 101 rotates through a predetermined angle, and an address/data bus 108h for interconnecting the foregoing components. The pulse coder 113 generates a position code indicating the position of the field pole of the synchronous motor 101, as well as rotation pulses produced whenever the motor 101 rotates through a predetermined angle. Numeral 114 denotes a pulse width modulation circuit, and 115 an inverter circuit controlled by the output signal of the pulse-width modulation circuit. Numeral 116 denotes a three-phase A.C. power supply, and 117 a well-known rectifier circuit comprising a group of diodes 117a and a capacitor 117b for converting the three-phase alternating current into direct current. As illustrated in FIG. 6, the pulse width modulation circuit 114 comprises a sawtooth generating circuit for generating a sawtooth waveform STS, comparators $COM_U$, $COM_V$, $COM_W$, NOT gates $NOT_1$ through $NOT_3$, and drivers $DV_1$ through $DV_6$. The inverter INV includes six power transistors $Q_1$ through $Q_6$ and six diodes $D_1$ through $D_6$. The comparators $COM_U$, $COM_V$, $COM_W$ of the pulse width modulation circuit PWM compare the sawtooth signal STS with the amplitudes of the three-phase alternating current signals $I_u$, $I_v$, $I_w$, respectively, and produce a "1" output when $I_u$, $I_v$ or $I_w$ is greater than the value of STS, or a "0" output when $I_u$, $I_v$ or $I_w$ is smaller. Thus, with respect to $i_u$, the comparator $COM_U$ produces the current command $i_{uc}$ shown in FIG. 7. More specifically, pulse-width modulated three-phase current commands $i_{uc}$, $i_{vc}$, $i_{wc}$ dependent upon the amplitudes of $i_u$, $i_v$, $i_w$ are produced. These three-phase current commands $i_u$, $i_v$, $i_w$ are delivered as inverter drive signals $SQ_1$ through $SQ_6$ via NOT gates $NOT_1$ through $NOT_3$ and drivers $DV_1$ through $DV_6$, and are applied as input signals to the inverter 115. The inverter drive signals $SQ_1$ through $SQ_6$ input to the inverter 115 are applied to the bases of the power transistors $Q_1$ through $Q_6$, respectively, thereby controlling the on/off action of the power transistors Q1 through Q6 to supply the synchronous motor 101 with a three-phase current.

Discussed next will be the operation of the arrangement of FIG. 5 in a case where the velocity command is elevated while the synchronous motor 101 is rotating at a certain velocity. The counter 108g is loaded with a position code immediately prior to the start of rotation of the synchronous motor 101, and the counter counts the rotation pulses $P_1$, $P_2$ which are generated as the synchronous motor 101 rotates. Accordingly, the counter 108g indicates the rotational position of the field pole of synchronous motor 101 at all times. Since the rotational pulses $P_1$, $P_2$ will be proportional to the velocity of the synchronous motor 101, the amount increase in the count in the counter 108g over a prescribed time interval will correspond to the rotational velocity of the synchronous motor 101.

(1) First, to rotate the synchronous motor 101 at a desired rotational velocity $V_c$, the input/output port 108d is supplied with a velocity command VCMD from an external unit such as an NC unit. This command is transmitted to the processor 108a via the bus 108h. Next, the processor 108a reads the value of the count in counter 108g via the bus 108h, computes the difference between this value and that read previously, and divides the difference by the sampling interval $T_2$ to compute the actual velocity Va (actual velocity sensing step). (2) Further, the processor 108a computes a velocity error ER, which is the difference between the velocity command VCMD and the actual velocity Va, and performs the operation indicated by the foregoing Eq. (15). Specifically, $$\sum_{i=0}^{k-1} [v(i) - r(i)]$$

and u(k−1) used at time (k−1), which is the previous sampling instant, are stored in the data memory 108c beforehand. Then, the following is computed:

$$S(k) = \sum_{i=0}^{k-1} [v(i) - r(i)] + ER$$

where $ER = v(k) - r(k)$ followed by computation of the following:

$$u(k) = -k_1 \cdot s(k) - k_2 \cdot v(k) - k_3 \cdot u(k-1) \qquad (22)$$

Then, s(k−1) in the data memory 108c is updated to s(k), and u(k−1) is updated to u(k) to prepare for the next computation. It should be noted that the results obtained by performing the computation of Eq. (22) correspond to the amplitude of the armature current. Specifically, when the load varies or the velocity command changes, the velocity error ER becomes greater, as does the current command amplitude $I_s$ correspondingly. The increased amplitude $I_s$ results in the production of a greater torque, which brings the actual rotational velocity of the motor into conformity with the commanded velocity. The amplitude command $I_s$ is obtained (IP control computation step).

Figure 8:
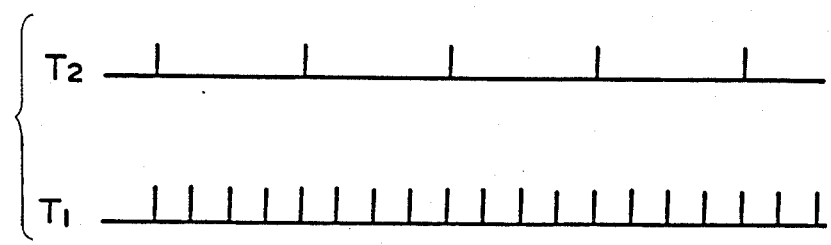
FIGS. 8 and 9 are views for describing operation according to the present invention.

The foregoing is a velocity loop computation step, which is performed at every sampling period $T_2$, as shown in FIG. 8.

(3) Next, based on the value of the count in counter 108g, the processor 108a retrieves, from a table stored in the data memory 108c, the digital value of sin α indicating the rotational position α of the field pole of synchronous motor 101, as well as the digital value of sin (α+2π/3) indicating the rotational position α+2π/3. Using these values, the processor 108a computes the three phase current commands $I_u$, $I_v$, $I_w$ from the following equations:

$$\left. \begin{array}{l} i_u = I_s \sin\alpha \\ i_v = I_s \sin(\alpha + 2\pi/3) \\ i_w = -i_u \cdot i_v \end{array} \right\} \qquad (23)$$

(4) Next, the processor 108a reads, via the bus 108h, the actual currents obtained by a digital conversion applied by the AC converter 108f to the actual phase currents $I_{av}$, $I_{aw}$, $I_{au}$ obtained from the current transformers 112U, 112V, 112W, respectively, computes the error between the three phase current command $\hat{i}_u$, $\hat{i}_v$, $\hat{i}_w$ and the actual phase currents $i_{av}$, $i_{aw}$, $i_{au}$, and performs the proportional integration operations given by the following equations to obtain the command values $i_u$, $i_v$, $i_w$ for application to the DA converter 108e:

$$\left. \begin{array}{l} i_u = K_1' (\hat{i}_u - i_{au}) + K_2' \sum_{i=1}^{k} (\hat{i}_u - i_{au}) \\ i_v = K_1' (\hat{i}_v - i_{av}) + K_2' \sum_{i=1}^{k} (\hat{i}_v - i_{av}) \\ i_w = K_1' (\hat{i}_w - i_{aw}) + K_2' \sum_{i=1}^{k} (\hat{i}_w - i_{aw}) \end{array} \right\} \quad (24)$$

Thus, when the processor 108a produces the current command $I_s(k-1)$ at the instant $k-1$, in order for the current loop to exercise control in such a manner that the effective current of the AC motor attains the value $I_s(k-1)$ by the next sampling instant (k) of the velocity loop, or in other words, in order for the current loop to carry out control at the sampling period $T_1$ in such a manner that the effective current of the AC motor is set to the current command $I_s$ of the velocity loop during the sampling period $T_2$, the gains $K_1'$, $K_2'$ in Eq. (24) are adjusted. The described control state will thus be realized.

(5) Next, the processor 108a multiplies the actual velocity Va, which was obtained in the foregoing velocity loop computation step, by the coefficient kf, obtains a velocity compensation output VCO, and subtracts this from the three-phase AC signals $i_u$, $i_v$, $i_w$, thereby obtaining compensated three-phase AC signals signals $i_u$, $i_v$, $i_w$. The foregoing is a current loop computation step, which is performed at every sampling period $T_1$ shown in FIG. 8.

The processor 108a sends the compensated three-phase AC signals $i_u$, $i_v$, $i_w$ thus obtained to the DA converter 108e via the bus 108h. These three-phase AC signals $i_u$, $i_v$, $i_w$ are thus converted into analog quantities which are delivered to the pulse-width modulating circuit 114. Thereafter, and in similar fashion, the synchronous motor 101 is supplied with three-phase current from the inverter 115.

Figure 9:
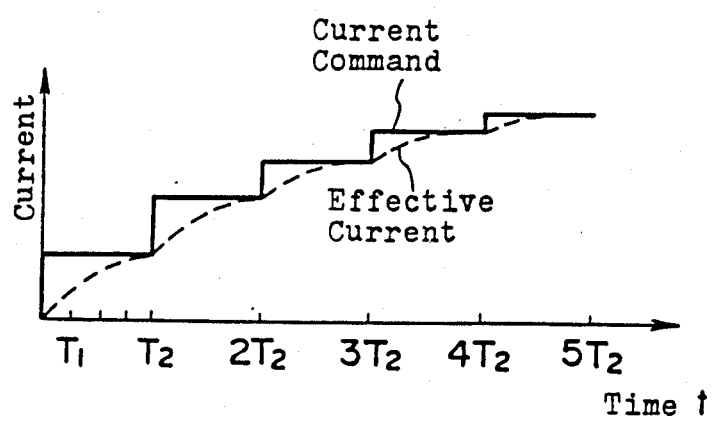

The processor 108a performs the velocity loop computation at every sampling period $T_2$, and performs the current loop computation at every sampling period $T_1$. In the example of FIG. 8, the current loop computation is performed four times for each velocity loop computation. As shown in FIG. 9, the current command base on the velocity loop computation varies in a step-like manner at the period $T_2$. By contrast, since the current loop computation is performed four times, the requirement that the current loop have a quick response characteristics can be satisfied if the gain of Eq. (24) is adjusted and the current response is set with respect to the command during $T_2$. The processor 108a controls the synchronous motor 101 by executing the above-described computations in accordance with the control program in the program memory 108b at the sampling periods $T_1$, $T_2$, whereby the synchronous motor 101 will eventually be rotated at the commanded velocity.

In the embodiment of FIG. 5, the velocity and current loop computations are performed by a single computation control unit. However, separate computation control units can be provided for the velocity and current loops, as shown in FIG. 4.

Further, an arrangement may be adopted in which the DA converter 108e in FIG. 5 is constituted by a counter and the processor 108a delivers the digital three-phase AC signal to this counter via the bus 108h, with the counter producing a pulse-width modulated output. In a case where pulse-width modulation is performed, an arrangement may be adopted as disclosed in the specification of Japanese Patent Application Laid-Open No. 53-48449, wherein a digital integrated circuit equipped with a clock generating circuit is used to drive an up/down counter circuit, and a programmable read-only memory responds to the up/down counter by generating a digital output signal which is proportional to a pulse-width modulated drive signal required for the power stage. Thus, a DC voltage may be digitally converted directly into an AC output waveform without using an AC reference waveform. In such case, the pulse-width modulation signal is delivered to a base drive circuit, so that an inverter can be controlled by this signal.

According to the present invention as described above, in performing a velocity loop computation and a current loop computation by an arithmetic circuit, the period of the current loop computation is shorted and the period of the velocity loop computation is lengthened. Therefore, an advantage which results is that the response characteristic of the current loop can be improved within the processing capability of the arithmetic circuit. In addition, the velocity and current loops can be rendered independent of each other. In performing the velocity loop computation, the amplitude command at the relevant sampling instant is corrected by the amplitude command value of the previous sampling, so that IP control is possible without computing the effective current at the relevant sampling instant. The resulting advantage is that the response characteristic of the velocity loop can be improved. This makes it possible to shorten the period of the current loop computation to an even greater extent.

While the present invention has been described in accordance with an embodiment thereof, the present invention is not limited to said embodiment but can be modified in various ways in accordance with the gist thereof without departing from the scope of the invention.

According to the present invention, in a system for controlling an AC motor by using a microprocessor to perform the velocity and current loop computations of the AC motor, the velocity and current loop response characteristics can be improved. The present invention therefore is well-suited for application to the field of AC motor control.

We claim:

1. An AC motor control system comprising:
   (a) velocity sensor means for sensing the velocity of an AC motor;
   (b) current sensor means for sensing an actual current flowing into said AC motor;
   (c) power drive circuit means for receiving a drive command and for driving said AC motor in accordance with said drive command; and
   (d) control means for performing a velocity loop computation at a first sampling period to obtain a current command from an offset velocity between a velocity command for said AC motor and said sensed actual velocity, and for performing a current loop computation to obtain an offset current between said current command and said sensed actual current, in said current loop computation, there is obtained a velocity compensation signal by amplifying said sensed actual velocity by a predetermined magnification, and the drive command for said power drive circuit is compensated by said velocity compensation signal, said current loop computation is executed at a second sampling period being shorter than said first sampling period, and, at the time of the velocity loop computation, the actual current at the relevant sampling instant is estimated from the current command value of the previous second sampling period, and the current command is computed from the estimated actual current and said offset current.

2. An AC motor control system according to claim 1, characterized in that said loop computation and said current loop computation are performed by a single processor.

3. An AC motor control system according to claim 1, characterized in that said velocity loop computation and said current loop computation are performed by separate computation control units for each computation.

* * * * *